(12) United States Patent
Shi et al.

(10) Patent No.: US 12,227,647 B2
(45) Date of Patent: Feb. 18, 2025

(54) THERMOPLASTIC FILMS AND METHODS FOR COATING THERMOPLASTIC SUBSTRATES WITH THERMOSET MATERIALS

(71) Applicant: The Boeing Company, Chicago, IL (US)

(72) Inventors: Ying Shi, St. Louis, MO (US); Timothy J. Luchini, St. Louis, MO (US); Marcos Pantoja, St. Louis, MO (US); Alexander M. Rubin, St. Louis, MO (US)

(73) Assignee: The Boeing Company, Arlington, VA (US)

( * ) Notice: Subject to any disclaimer, the term of this patent is extended or adjusted under 35 U.S.C. 154(b) by 249 days.

(21) Appl. No.: 17/530,978

(22) Filed: Nov. 19, 2021

(65) Prior Publication Data
US 2023/0159754 A1    May 25, 2023

(51) Int. Cl.
| | |
|---|---|
| *C08L 79/08* | (2006.01) |
| *B29C 43/00* | (2006.01) |
| *B29K 71/00* | (2006.01) |
| *B29K 79/00* | (2006.01) |
| *C08L 71/12* | (2006.01) |

(52) U.S. Cl.
CPC ............ *C08L 79/08* (2013.01); *B29C 43/003* (2013.01); *C08L 71/12* (2013.01); *B29K 2071/12* (2013.01); *B29K 2079/085* (2013.01)

(58) Field of Classification Search
CPC ..... C08G 2650/40; C08L 79/08; C08L 71/12; B29K 2071/12; B29K 2079/085; B32B 27/281; B32B 27/285
See application file for complete search history.

(56) References Cited

U.S. PATENT DOCUMENTS

| | | |
|---|---|---|
| 5,066,536 A | 11/1991 | Cogswell et al. |
| 2003/0186068 A1 | 10/2003 | Taniguchi et al. |
| 2010/0170637 A1 | 7/2010 | Iannone |
| 2015/0298388 A1 | 10/2015 | Wong et al. |
| 2021/0102068 A1 | 4/2021 | Said et al. |

FOREIGN PATENT DOCUMENTS

| | | | |
|---|---|---|---|
| CN | 106832760 A | * 6/2017 | ............. B29C 48/92 |
| EP | 2 899 231 | 7/2015 | |
| EP | 3 854 834 | 7/2021 | |
| JP | 2019156974 A | * 9/2019 | |
| WO | WO 2006/006508 | 1/2006 | |

OTHER PUBLICATIONS

CN 106832760 A machine translation (Jun. 13, 2017).*
JP-2019156974-A (Sep. 19, 2019) machine translation.*
Smiley et al.: "Dual polymer bonding of thermoplastic composite structures," Polymer Engineering & Science (Apr. 1991).
European Patent Office, Extended European Search Report, App. No. 22194863.1 (May 19, 2023).
Harris et al: "Miscible blends of poly(aryl ether ketone)s and polyetherimides," *Journal of Applied Polymer Science*, vol. 35, No. 7, pp. 1877-1891 (May 20, 1988).
Crevecoeur et al: "Binary Blends of Poly(ether ether ketone) and Poly(ether imide) Miscibility, Crystallization Behavior, and Semicrystalline Morphology," *Macromolecules, American Chemical Society, US*, vol. 24, No. 5, pp. 1190-1195 (Mar. 4, 1991).

* cited by examiner

*Primary Examiner* — Ana L. Woodward
(74) *Attorney, Agent, or Firm* — Walters & Wasylyna LLC

(57) ABSTRACT

A thermoplastic composition includes a thermoplastic polymer and a polyaryletherketone polymer in admixture with the thermoplastic polymer.

20 Claims, 6 Drawing Sheets

THERMOPLASTIC FILMS AND METHODS FOR COATING THERMOPLASTIC SUBSTRATES WITH THERMOSET MATERIALS

FIELD

This application relates to thermoplastic compositions and, more specifically, to thermoplastic films and methods for coating thermoplastic substrates with thermoset materials in the aerospace industry.

BACKGROUND

The process of finishing polyaryletherketone-based structural thermoplastic composites presents challenges, specifically with respect to medium and large-scale components, particularly those used in airstream applications. Current surface treatment techniques include the need for mechanically treating substrate surfaces using techniques such as sand blasting, grit blasting, plasma treatment, and other techniques that roughen substrate surfaces prior to bonding with a thermoset material.

Conventional surface treatment techniques present challenges with respect to adhesion and miscibility. Therefore, those skilled in the art continue with research and development efforts in the field of coating thermoplastic substrates with thermoset materials.

SUMMARY

Disclosed are thermoplastic compositions.

In one example, the disclosed thermoplastic composition includes a thermoplastic polymer and a polyaryletherketone polymer in admixture with the thermoplastic polymer.

Also disclosed are consolidated laminate structures.

In one example, the disclosed consolidated laminate structure includes a thermoplastic substrate including a thermoplastic polymer and a thermoplastic composition consolidated with the thermoplastic substrate to define a receiving surface. The thermoplastic composition includes a thermoplastic polymer and a polyaryletherketone polymer in admixture with the thermoplastic polymer.

Also disclosed are methods for manufacturing consolidated laminate structures.

In one example, the disclosed method for manufacturing a consolidated laminate structure includes applying a thermoplastic composition to a first major surface of a thermoplastic substrate. The thermoplastic composition includes a thermoplastic polymer and a polyaryletherketone polymer in admixture with the thermoplastic polymer. The method further includes co-consolidating the thermoplastic composition with the thermoplastic substrate to define a receiving surface.

DETAILED DESCRIPTION

Disclosed are compositions and methods for chemically modifying a receiving surface of a thermoplastic composite substrate. The compositions and methods improve compatibility of a thermoplastic composite substrate and a thermoset coating, such as an epoxy-based primer. The disclosed compositions and methods account for threshold adhesive properties with the thermoset coating and miscibility of the components of the compositions. The result is a modified surface of the thermoplastic composite material to enhance compatibility to a thermoset coating.

Figure 1:
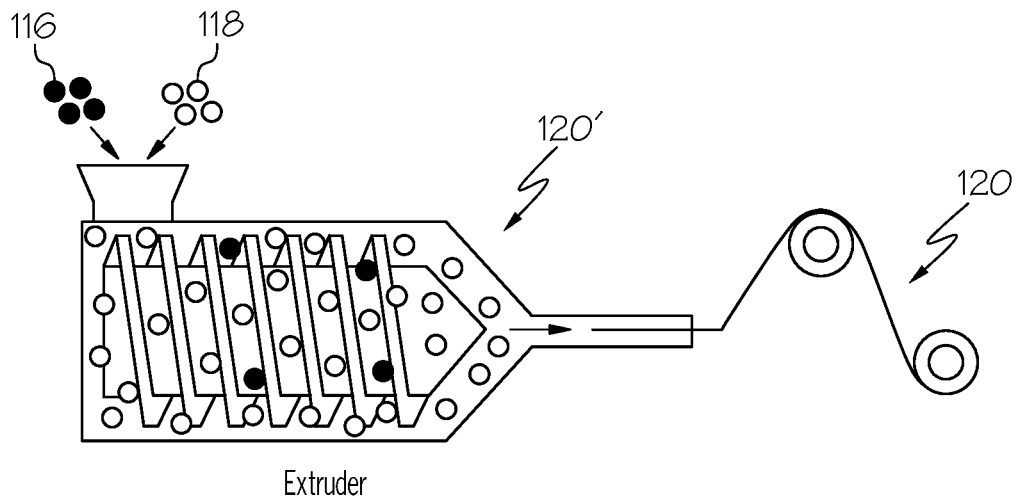
FIG. 1 is a schematic diagram of a method for forming a thermoplastic film.

Referring to FIG. 1, disclosed is a thermoplastic composition 120'. The thermoplastic composition includes a thermoplastic polymer 116 and a polyaryletherketone polymer 118 in admixture with the thermoplastic polymer 116. The thermoplastic composition may be manufactured by combining and blending the thermoplastic polymer and the polyaryletherketone polymer 118 in an extruder and extruding the resulting composition into a coating, such as a film 120.

Figure 2:
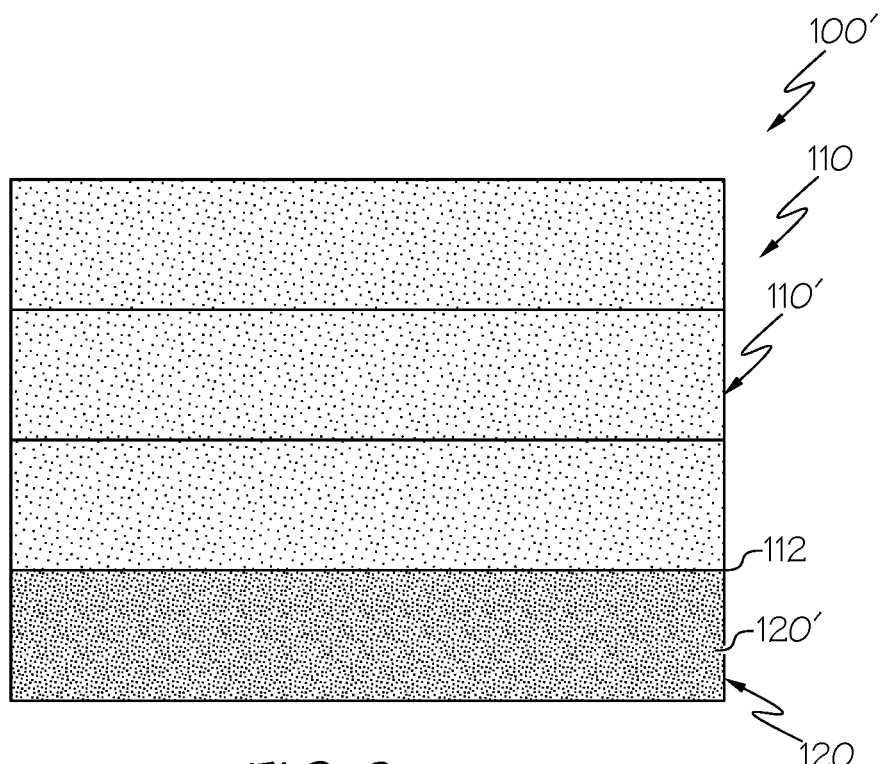
FIG. 2 is a cross sectional schematic of a laminate structure prior to consolidation.
Figure 4:
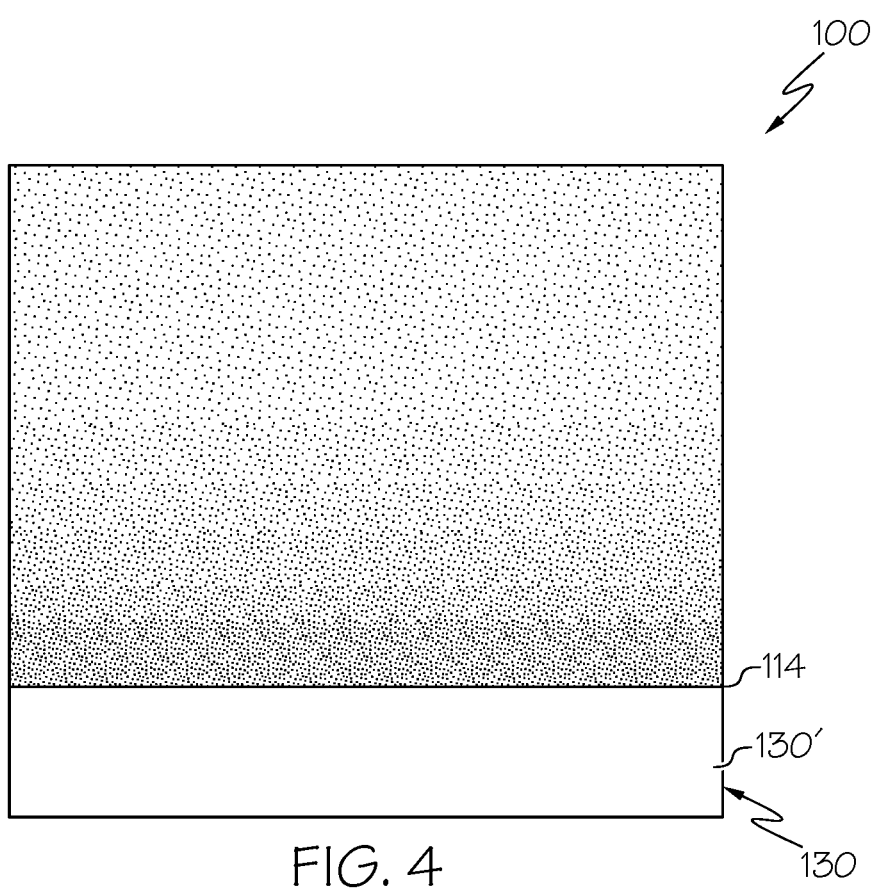
FIG. 4 is a cross sectional schematic of the laminate structure of FIG. 3 with an additional coating.

As shown in FIGS. 2 and 4, the thermoplastic polymer 116 (FIG. 1) of the thermoplastic composition 120' may be selected based upon material properties such as threshold adhesive properties that align with a mating thermoset coating 130 and miscibility with the thermoplastic substrate 110 material such that a first major surface 112 of a receiving thermoplastic substrate 110 is modified to enhance compatibility with a thermoset coating 130. Further, the thermoplastic polymer 116 is miscible with polyaryletherketone polymers. In one example, the thermoplastic polymer 116 of the thermoplastic composition 120' includes polyetherimide. The thermoplastic polymer 116 may be amorphous. The thermoplastic polymer 116 is compatible with aerospace grade paints and coatings and is stable at processing temperatures of at least about 350° C.

In one example, the polyaryletherketone polymer 118 is a semi-crystalline material belonging to the family of polyaryletherketone (PAEK) polymers. The polyaryletherketone polymer 118 may be in the form of a film plastic pellets, powder, etc. The polyaryletherketone polymer 118 may include polyether ether ketone. In another example, the polyaryletherketone polymer includes polyether ketone ketone. In yet another example, the polyaryletherketone polymer includes a blend of at least two polyaryletherketones. For example, the polyaryletherketone polymer may include a blend of polyether ketone ketone and polyether ether ketone.

The thermoplastic composition 120' has a melting temperature based upon the ratio of thermoplastic polymer 116 to the polyaryletherketone polymer 118 and the respective melting temperatures of each of the thermoplastic polymer to the polyaryletherketone polymer 118. In one example, the melting temperature of the polyaryletherketone polymer 118 is about 275° C. to about 350° C. In another example, the melting temperature of the polyaryletherketone polymer 118 is at least about 300° C.

The thermoplastic composition 120' includes a ratio of the thermoplastic polymer 116 to the polyaryletherketone polymer 118. In one example, the ratio of the thermoplastic polymer 116 to the polyaryletherketone polymer 118 is between about 1:20 and about 1:1. In another example, the ratio of the thermoplastic polymer 116 to the polyaryletherketone polymer 118 is between about 10:90 and about 50:50. In another example, the ratio of the thermoplastic polymer 116 to the polyaryletherketone polymer 118 is between about 1:9 and about 1:1. In yet another example, the ratio of the thermoplastic polymer 116 to the polyaryletherketone polymer 118 is between about 20:80 and about 50:50.

The thermoplastic composition 120' includes a degree of crystallinity such that it is a semi-crystalline material. In one example, the degree of crystallinity is from about 1 percent to about 30 percent. In another example, the degree of crystallinity is from about 2 percent to about 15 percent. In yet another example, the degree of crystallinity is from about 3 percent to about 10 percent.

The thermoplastic composition 120' may include additional additives. In one example, the thermoplastic composition 120' includes a heat stabilizer. In another example, the thermoplastic composition 120' includes a nucleating agent.

Figure 3:
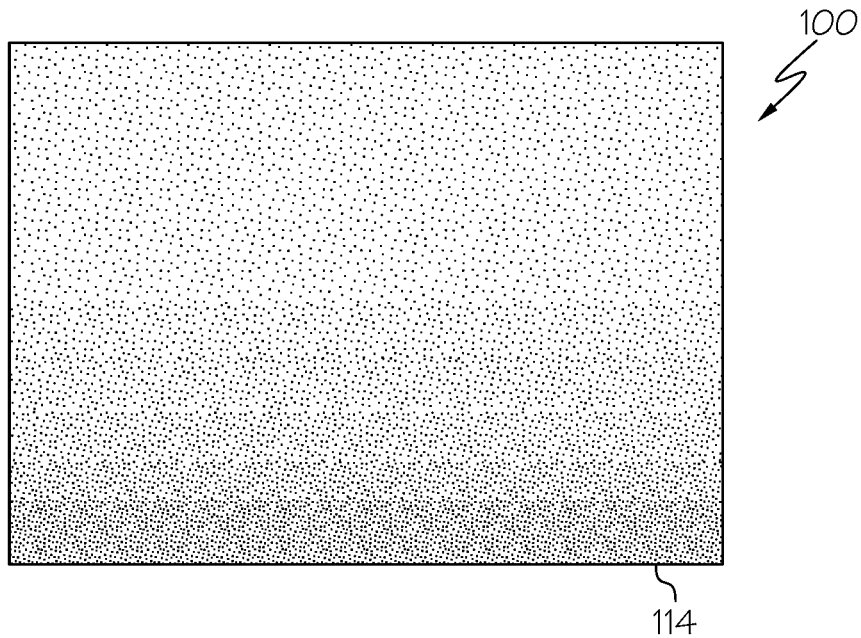
FIG. 3 is a cross sectional schematic of the laminate structure of FIG. 2 after consolidation.

Referring to FIG. 2, the thermoplastic composition 120' may be extruded into a film 120 for application on a thermoplastic substrate 110 to form a laminate structure 100'. In one example, the film 120 has a thickness of about 1 mil to about 15 mil. The laminate structure 100' may be co-consolidated into a consolidated laminate structure 100, see FIG. 3. In one example, the consolidated laminate structure 100 includes a thermoplastic substrate 110. The thermoplastic substrate 110 includes a thermoplastic polymer. In one example, the thermoplastic polymer of the thermoplastic substrate 110 includes a polyaryletherketone polymer.

The thermoplastic substrate 110 may be formed of at least two plies 110' of laminate in a stacked configuration. The at least two plies 110' of laminate may include a polymer from the family of polyaryletherketone (PAEK) polymers. In one example, the at least two plies 110' of laminate include polyether ketone ketone.

The consolidated laminate structure 100 further includes a thermoplastic composition 120' consolidated with the thermoplastic substrate 110 to define a receiving surface 114 of the consolidated laminate structure 100. The thermoplastic composition 120' includes a thermoplastic polymer 116 and a polyaryletherketone polymer 118 in admixture with the thermoplastic polymer 116.

The thermoplastic polymer 116 of the thermoplastic composition 120' may be selected based upon material properties such as threshold adhesive properties that align with a mating thermoset coating 130 and miscibility with the thermoplastic substrate 110 material such that a first major surface 112 of a receiving thermoplastic substrate 110 is modified to enhance compatibility with a thermoset coating 130. In one example, the thermoplastic polymer of the consolidated laminate structure 100 includes polyetherimide. The thermoplastic polymer 116 may be amorphous. The thermoplastic polymer 116 is compatible with aerospace grade paints and coatings and is stable at processing temperatures of at least about 350° C.

In one example, the polyaryletherketone polymer 118 of the consolidated laminate structure 100 includes at least one of polyether ether ketone and polyether ketone ketone. In another example, the polyaryletherketone polymer 118 of the consolidated laminate structure 100 includes a blend of polyether ether ketone and polyether ketone ketone.

In one example, the ratio of the thermoplastic polymer 116 to the polyaryletherketone polymer 118 is between about 1:20 and about 1:1. In another example, the ratio of the thermoplastic polymer 116 to the polyaryletherketone polymer 118 is between about 10:90 and about 50:50. In another example, the ratio of the thermoplastic polymer 116 to the polyaryletherketone polymer 118 is between about 1:9 and about 1:1. In yet another example, the ratio of the thermoplastic polymer 116 to the polyaryletherketone polymer 118 is between about 20:80 and about 50:50.

Referring to FIG. 4, the consolidated laminate structure 100 may further include a thermoset material 130' applied to the receiving surface 114. In one example, the thermoset material 130' is in the form of a thermoset coating 130. In one example, the thermoset material 130' may include an epoxy. In another example, the thermoset material 130' may be a primer, such as a paint primer. Additionally, the consolidated laminate structure 100 may further include a top coat 140 applied to the thermoset material 130', or primer, see FIG. 5. In one example, the top coat 140 includes polyurethane.

Figure 6:
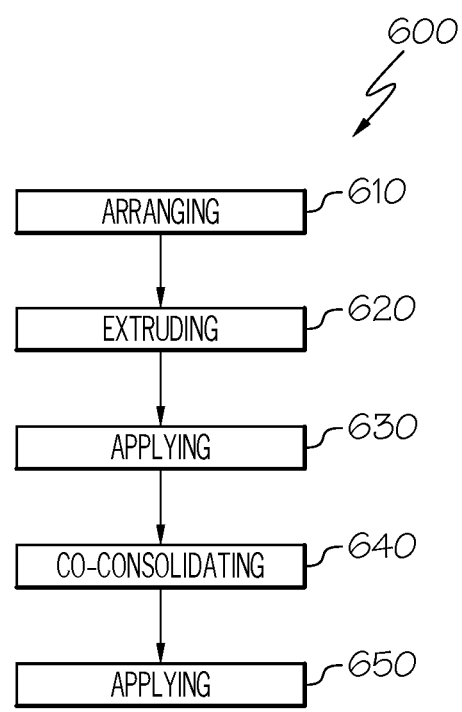
FIG. 6 is a flow diagram of a method for manufacturing a consolidated laminate structure.

Referring to FIG. 6, disclosed is a method 600 for manufacturing a consolidated laminate structure 100. The method 600 includes applying a thermoplastic composition to a first major surface 112 of a thermoplastic substrate 110. In one example, the thermoplastic substrate is a layered structure including at least two layers of thermoplastic material.

The thermoplastic composition 120' of the method 600 includes a thermoplastic polymer 116 and a polyaryletherketone polymer in admixture with the thermoplastic polymer 116. In one example, the thermoplastic polymer 116 comprises polyetherimide. Further, in one or more examples, the polyaryletherketone polymer 118 comprises at least one of polyether ether ketone and polyether ketone ketone, or a blend of polyether ether ketone and polyether ketone ketone.

In one example, the thermoplastic substrate 110 of the method 600 includes a polyaryletherketone polymer 118. Further, in one or more examples, the polyaryletherketone polymer of the thermoplastic composition 120' and the polyaryletherketone polymer of the thermoplastic substrate 110 are one and the same.

Still referring to FIG. 6, the method 600 further includes co-consolidating 640 the thermoplastic composition with the thermoplastic substrate 110 to define a receiving surface 114. In one or more examples, the co-consolidating 640 is performed at a temperature of about 275° C. to about 400° C. In another example, the co-consolidating 640 is performed at a temperature of about 330° C. to 400° C. In yet another example, the co-consolidating 640 is performed at a temperature of at least 340° C. The co-consolidating 640 may include any means including compression molding or stamp forming.

Figure 5:
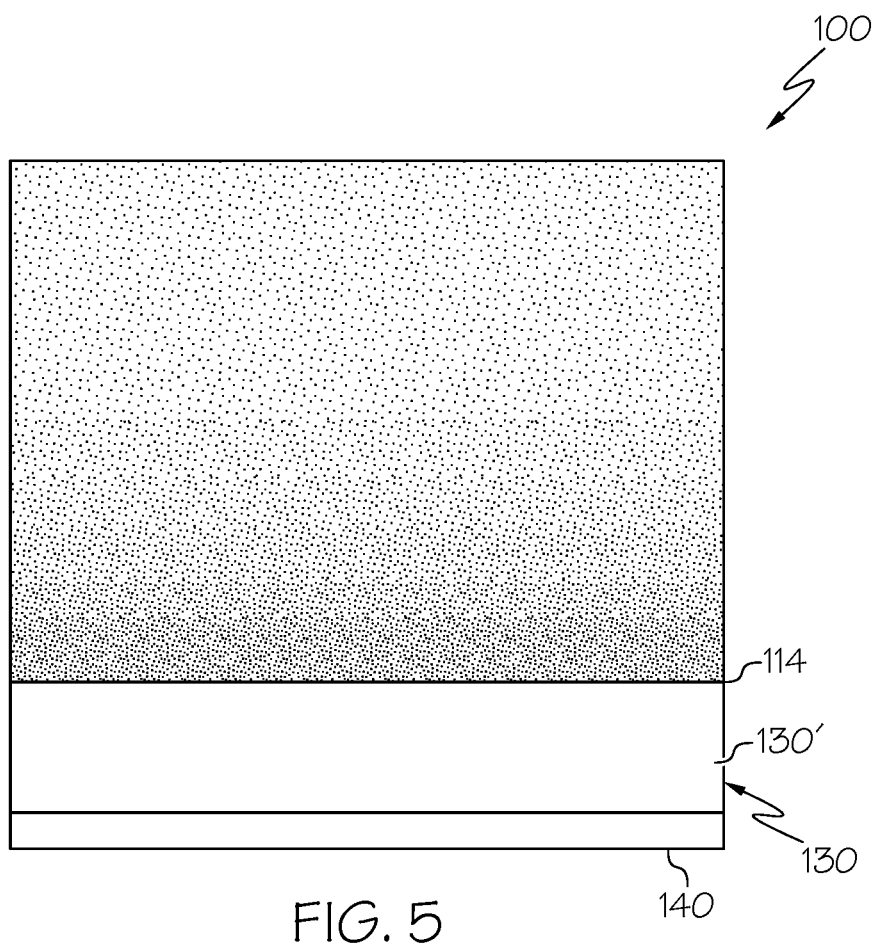
FIG. 5 is a cross sectional schematic of the laminate structure of FIG. 4 with an additional coating.

The method 600 may further include applying 650 a thermoset material 130', such as a thermoset coating 130, to the receiving surface 114. In one example, the thermoset material 130' of the method 600 includes an epoxy. In another example, the thermoset material 130' of the method 600 is a primer, such as a paint primer. Referring to FIG. 5, the method 600 may further include applying a top coat 140 to the thermoset material 130'. In one example, the top coat 140 includes polyurethane.

Still referring to FIG. 6, the method 600 may further include, prior to the applying 630, extruding 620 the thermoplastic polymer 116 and the polyaryletherketone polymer 118 to yield the thermoplastic composition 120'. The extruding 620 may include extruding 620 the thermoplastic composition 120' to a thermoplastic film 120.

The method 600 may further include, prior to the applying 630, arranging 610 at least two plies 110' of laminate in a stacked configuration to yield the thermoplastic substrate 110. The arranging 610 may be performed by any suitable means of arranging plies of laminate. The at least two plies 110' of laminate may include at least one of polyether ether ketone or polyether ketone ketone, or a blend thereof.

Figure 7:
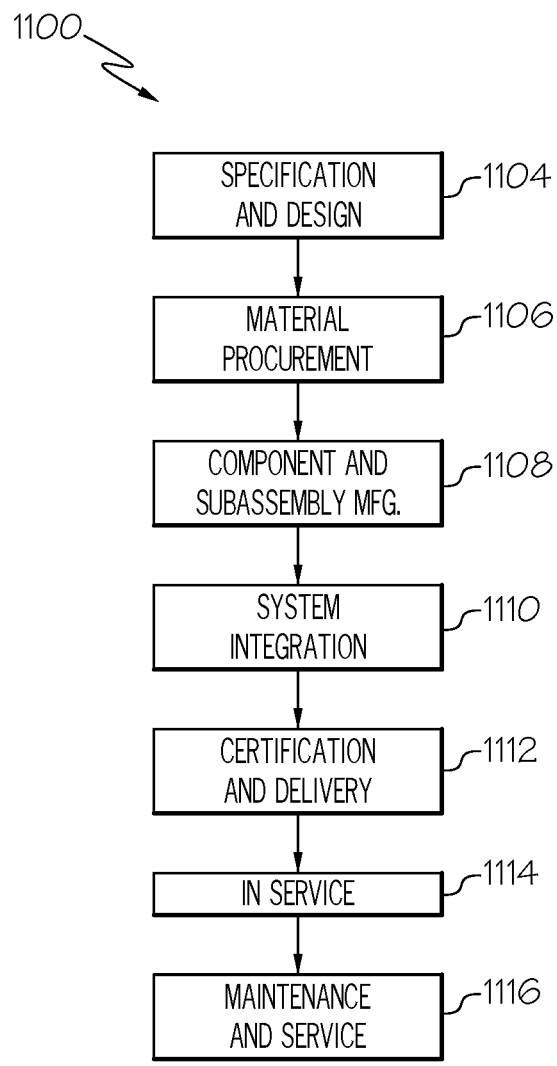
FIG. 7 is a block diagram of aircraft production and illustrative methodology.
Figure 8:
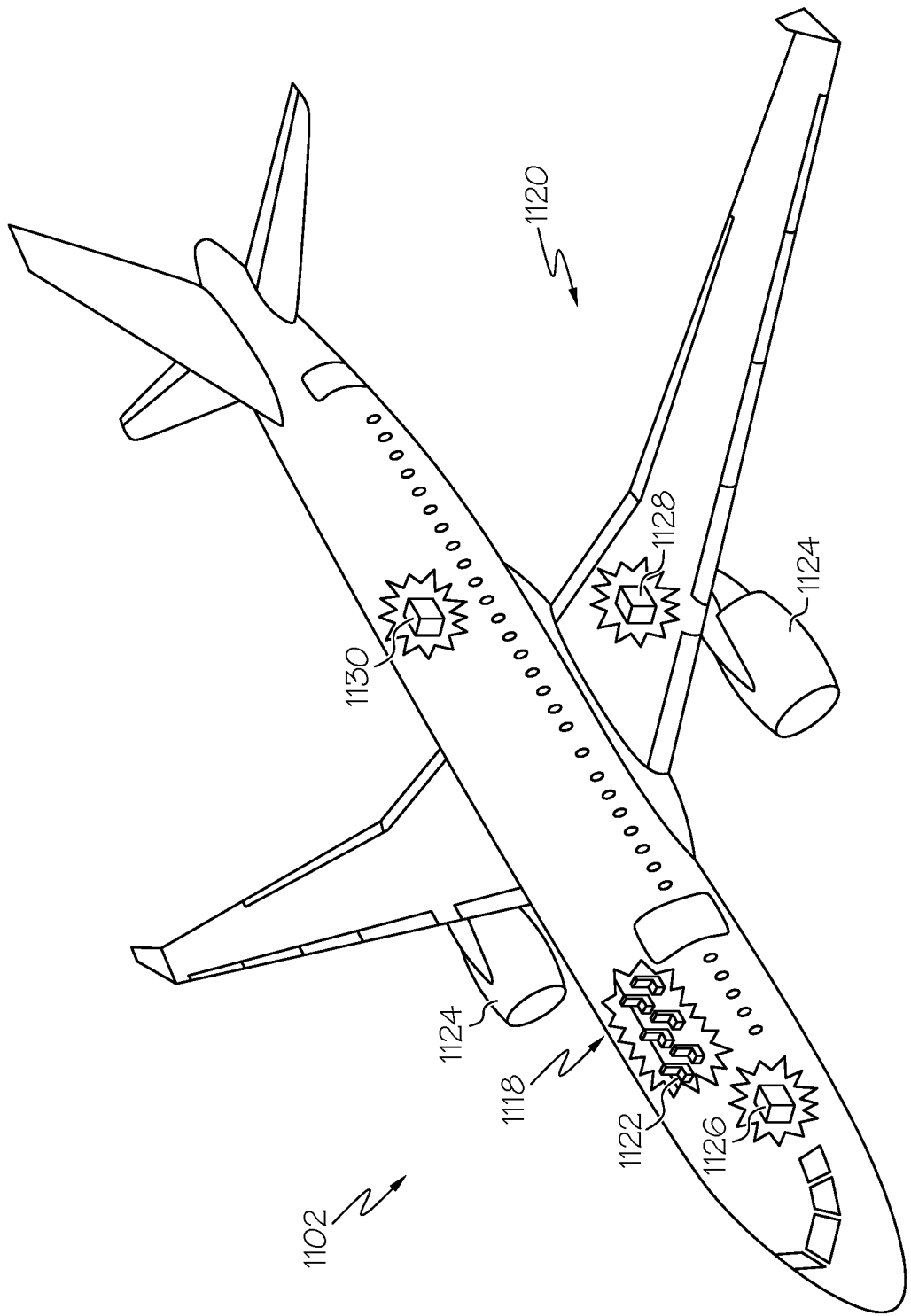
FIG. 8 is a schematic illustration of an aircraft.

Referring to FIG. 7 and FIG. 8, the disclosed consolidated laminate structure 100, thermoplastic composition 120' and method 600 will be used in the context of aircraft manufacturing and service including material procurement (block 1106), production, component and subassembly manufacturing (block 1108), and certification and delivery (block 1112) of aircraft 1102.

Examples of the subject matter disclosed herein may be described in the context of aircraft manufacturing and illustrative method 1100 as shown in FIG. 7 and aircraft 1102 as shown in FIG. 8. In one or more examples, the consolidated laminate structure 100 comprises a stringer assembly used in aircraft manufacturing. During pre-production, illustrative method 1100 may include specification and design (block 1104) of aircraft 1102 and material procurement (block 1106). During production, component and subassembly manufacturing (block 1108) and system integration (block 1110) of aircraft 1102 may take place. Thereafter, aircraft 1102 may go through certification and delivery (block 1112) to be placed in service (block 1114). While in service, aircraft 1102 may be scheduled for routine maintenance and service (block 1116). Routine maintenance and service may include modification, reconfiguration, refurbishment, etc. of one or more systems of aircraft 1102.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, aircraft 1102 produced by illustrative method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Apparatus(es) and method(s) shown or described herein may be employed during any one or more of the stages of the manufacturing and illustrative method 1100. For example, components or subassemblies corresponding to component and subassembly manufacturing (block 1108) may be fabricated or manufactured in a manner similar to components or subassemblies produced while aircraft 1102 is in service (block 1114). Also, one or more examples of the apparatus(es), method(s), or combination thereof may be utilized during production stages component and subassembly manufacturing (block 1108) and system integration (block 1110), for example, by substantially expediting assembly of or reducing the cost of aircraft 1102. Similarly, one or more examples of the apparatus or method realizations, or a combination thereof, may be utilized, for example and without limitation, while aircraft 1102 is in service (block 1114) and/or during maintenance and service (block 1116).

Different examples of the composition(s), structure(s) and method(s) disclosed herein include a variety of components, features, and functionalities. It should be understood that the various examples of composition(s), structure(s) and method(s), disclosed herein, may include any of the components, features, and functionalities of any of the other examples of the composition(s), structure(s) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A thermoplastic composition comprising:
polyetherimide polymer; and
a polyaryletherketone polymer, wherein the polyaryletherketone polymer is one of polyether ketone ketone polymer or a blend of polyether ketone ketone polymer and polyether ether ketone polymer,
wherein a ratio of the polyetherimide polymer to the polyaryletherketone polymer is between about 1:20 and 1:9,
wherein the thermoplastic composition comprises a degree of crystallinity from 3 percent to about 30 percent.

2. The thermoplastic composition of claim 1 wherein the polyaryletherketone polymer comprises a blend of polyether ketone ketone and polyether ether ketone.

3. The thermoplastic composition of claim 2 comprising a degree of crystallinity from 3 percent to about 15 percent.

4. The thermoplastic composition of claim 2 comprising a degree of crystallinity from 3 percent to about 10 percent.

5. The thermoplastic composition of claim 1 comprising a degree of crystallinity from 3 percent to about 15 percent.

6. The thermoplastic composition of claim 1 comprising a degree of crystallinity from 3 percent to about 10 percent.

7. The thermoplastic composition of claim 1 wherein the polyaryletherketone polymer has a melting temperature of about 275° C. to about 350° C.

8. The thermoplastic composition of claim 1 wherein the polyaryletherketone polymer has a melting temperature of at least about 300° C.

9. The thermoplastic composition of claim 1 further comprising a heat stabilizer.

10. The thermoplastic composition of claim 1 further comprising a nucleating agent.

11. A film comprising the thermoplastic composition of claim 1.

12. The film of claim 11 comprising a thickness of about 1 mil to about 15 mil.

13. The film of claim 11 wherein the polyaryletherketone polymer comprises a blend of polyether ketone ketone and polyether ether ketone.

14. The film of claim 13 comprising a degree of crystallinity from 3 percent to about 15 percent.

15. The film of claim 13 comprising a degree of crystallinity from 3 percent to about 10 percent.

16. The film of claim 11 comprising a degree of crystallinity from 3 percent to about 15 percent.

17. The film of claim 11 comprising a degree of crystallinity from 3 percent to about 10 percent.

18. The film of claim 11 wherein the polyaryletherketone polymer has a melting temperature of about 275° C. to about 350° C.

19. The film of claim 11 wherein the polyaryletherketone polymer has a melting temperature of at least about 300° C.

20. The film of claim 11 wherein the thermoplastic composition further comprises a heat stabilizer.

\* \* \* \* \*